US012715712B2

(12) United States Patent
Fourney

(10) Patent No.: US 12,715,712 B2
(45) Date of Patent: Aug. 25, 2026

(54) DYNAMIC SORTING OF ITEMS IN A CONVEYOR SYSTEM

(71) Applicant: Laitram, L.L.C., Harahan, LA (US)

(72) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 179 days.

(21) Appl. No.: 18/715,932

(22) PCT Filed: Dec. 8, 2022

(86) PCT No.: PCT/US2022/052225
§ 371 (c)(1),
(2) Date: Jun. 3, 2024

(87) PCT Pub. No.: WO2023/107604
PCT Pub. Date: Jun. 15, 2023

(65) Prior Publication Data

US 2025/0033896 A1 Jan. 30, 2025

Related U.S. Application Data

(60) Provisional application No. 63/287,667, filed on Dec. 9, 2021.

(51) Int. Cl.
*B65G 47/46* (2006.01)
*B07C 3/08* (2006.01)
*B65G 47/44* (2006.01)

(52) U.S. Cl.
CPC ................ *B65G 47/46* (2013.01); *B07C 3/08* (2013.01); *B65G 47/44* (2013.01)

(58) Field of Classification Search
CPC ........ B65G 47/44; B65G 47/46; B65G 47/53; B07C 3/08
See application file for complete search history.

(56) References Cited

U.S. PATENT DOCUMENTS 8,919,529 B1 * 12/2014 Erceg .................. B65G 47/962 198/360
9,415,425 B2 * 8/2016 Panunto .................... B07C 5/34
(Continued)

FOREIGN PATENT DOCUMENTS

JP 2013-147304 A 8/2013
WO WO-2017202242 A1 * 11/2017 .............. B07C 3/02
(Continued)

OTHER PUBLICATIONS

US 2014/0142746 A1, Vegh et al., May 22, 2014.*
(Continued)

*Primary Examiner* — Douglas A Hess
(74) *Attorney, Agent, or Firm* — Catherine M. Bishop

(57) ABSTRACT

A sorting system for dynamically sorting items includes movable receptacles that can receive sorted items from a sorting conveyor on the fly. A controller determines and coordinates the movement between the sorted items and the movable receptacle, so that sorted items land in the movable receptacle while the receptacle is moving. A queue of receptacles alongside a sorting conveyor and extending into an overflow region can dynamically move, contract, advance and—or reverse as needed, based on the items being sorted.

16 Claims, 11 Drawing Sheets

(56) References Cited

U.S. PATENT DOCUMENTS

| | | | | |
|---|---|---|---|---|
| 10,732,644 | B2 | 8/2020 | Mithal et al. | |
| 10,752,454 | B2 | 8/2020 | Burns | |
| 10,913,467 | B2 * | 2/2021 | Ascani | B65G 13/12 |
| 10,968,087 | B2 | 4/2021 | Zhu et al. | |
| 11,033,935 | B2 | 6/2021 | Czukor et al. | |
| 11,052,430 | B2 | 7/2021 | Rieu et al. | |
| 11,066,241 | B2 | 7/2021 | Issing et al. | |
| 11,084,666 | B1 | 8/2021 | Eddy et al. | |
| 11,103,896 | B2 | 8/2021 | Grupp et al. | |
| 11,104,519 | B2 | 8/2021 | Hutter et al. | |
| 11,219,925 | B2 | 1/2022 | Chirol et al. | |
| 11,311,913 | B2 | 4/2022 | Beaugrand et al. | |
| 11,878,325 | B1 | 1/2024 | Serstad et al. | |
| 11,905,125 | B1 * | 2/2024 | Coats | B65G 65/00 |
| 2017/0368578 | A1 | 12/2017 | Zimmer et al. | |
| 2022/0297160 | A1 | 9/2022 | Costanzo et al. | |

FOREIGN PATENT DOCUMENTS

| | | | | |
|---|---|---|---|---|
| WO | 2018191512 | A1 | 10/2018 | |
| WO | 2018231349 | A1 | 12/2018 | |
| WO | WO-2021252073 | A1 * | 12/2021 | B65G 37/005 |

OTHER PUBLICATIONS

US 2024/0329661 A1, Fleming et al., Oct. 3, 2024.*

Extended European Search Report, European Application No. 22905113.1, dated Nov. 13, 2025, European Patent Office, Munich, Germany.

* cited by examiner 410
400
411
400

410
4002
432
431
411
433
4001
4003

410
4002
4004
434
433
411
436
435
4001
4003

410
4002
4004
4006
400
430
436
430
4001
4003
4005
400

DYNAMIC SORTING OF ITEMS IN A CONVEYOR SYSTEM

RELATED APPLICATIONS

The present application claims priority to U.S. Provisional Patent Application No. 63/287,667, filed Dec. 9, 20201 and entitled "Dynamic Sorting of Items", the contents of which are herein incorporated by reference.

FIELD OF THE INVENTION

The present invention relates to a power-driven conveyors forming sorting systems for sorting items, such as parcels, into receptacles, such as bins. More particularly, the present invention relates to a sorting system that can sort items from a conveyor onto moving receptacles on the fly.

BACKGROUND

In various industries, such as in package- and parcel-handling, sorting conveyors are used to sort parcels off one or both sides of a sorting conveyor onto discharge chutes and into selected receptacles. The increasing demand for next-day delivery of articles such as parcels, packages, and letters requires high-throughput sorting systems to rapidly sort articles to selected receptacles.

Current sorter systems include fixed chutes at discrete locations alongside a conveyor for directing sorted articles into static receptacles. These sorter systems include chutes having static side walls that form output channels to guide sorted items into the correct receptacle and prevent items from falling into an adjacent receptacle.

SUMMARY OF THE INVENTION

A sorting system for dynamically sorting items includes a queue of movable receptacles that can receive sorted items from a sorting conveyor on the fly. A controller determines and coordinates the movement between the sorted items and the movable receptacle, so that sorted items can land in the movable receptacle while the receptacle is moving. The queue of receptacles alongside a sorting conveyor can dynamically move, contract, advance and—or reverse as needed, based on the items being sorted. Trapezoidal-shaped collection receptacles, having a longer wall adjacent the sorting conveyor, facilitate the reconfiguration of the queue of receptacles as needed.

According to a first aspect, a sorting system comprises a plurality of sorting regions arranged in series and extending longitudinally from a first end to a second end and forming a sorter output area, a chute extending at a downward angle from the plurality of sorting regions, the chute having a continuous surface extending from the first end to the second end, a top edge adjacent a first side of the plurality of sorting regions and a bottom edge below the top edge and a plurality of movable receptacles in the sorter output area below the bottom edge of the chute for receiving items from the sorting regions.

According to another aspect, a sorting system comprises a plurality of sorting regions arranged in series and extending longitudinally from a first end to a second end to form a sorter output area and a queue of movable receptacles adjacent a first side of the plurality of sorting regions for receiving items from the sorting regions. Each movable receptacle has a trapezoidal shape, having a length that tapers away from the plurality of sorting regions.

According to another aspect, a method of sorting an item into a selected receptacle comprises the steps of identifying a movable receptacle for an item, conveying the item to a sorting region in a sorting conveyor, moving the movable receptacle to a selected position near the sorting region and deflecting the item from the sorting region so that the item lands on the movable receptacle while the movable receptacle is moving.

DETAILED DESCRIPTION

A sorting system dynamically sorts items onto moving receptacles on the fly to increase sorting efficiency. The invention will be described below relative to certain illustrative embodiments, though the invention is not limited to the illustrative embodiments.

Figure 1:
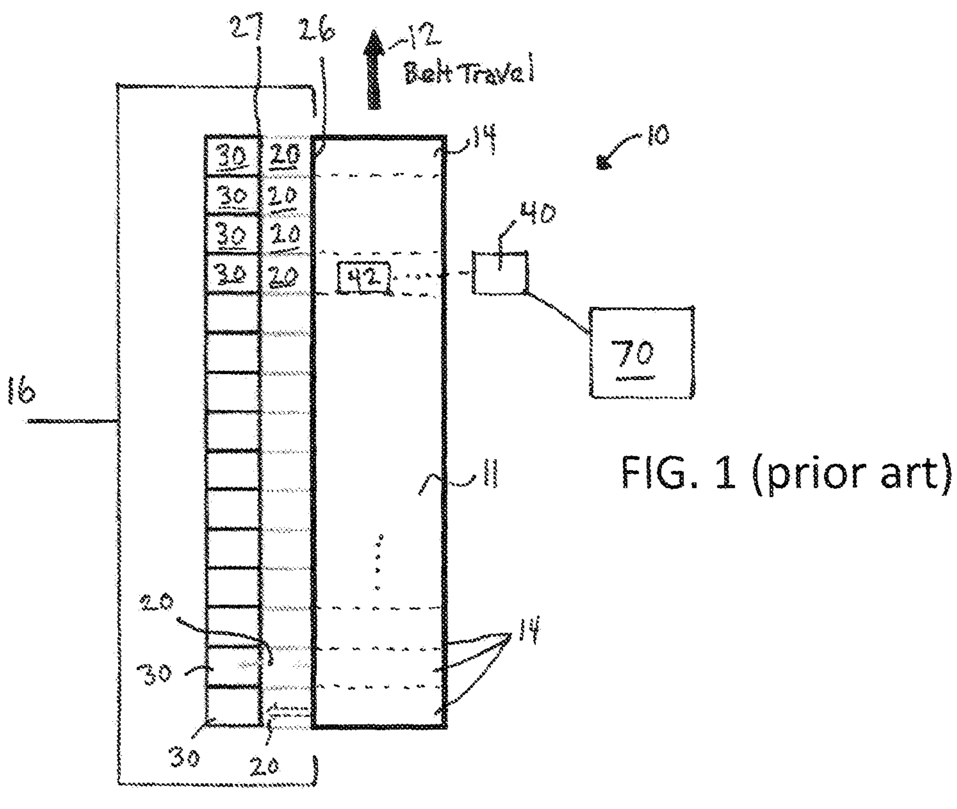
FIG. 1 is a schematic overhead view of a traditional sorting system for sorting items into collection devices.

Referring to FIG. 1, a traditional sorting system 10 comprises a conveyor 11 for conveying items, such as packages and parcels, in a conveying direction 12. The conveyor 11 comprises multiple sorting regions 14 along the length of the conveyor 11. In each sorting zone 14, items can be sorted off the conveyor onto dedicated chutes 20, depending on a predetermined characteristic, such as the final destination of the package (i.e., zip code, city, etc) or another parameters, such as size or weight. Each chute directs a diverted item to a designated receptacle 30 associated with the chute 20.

At each sorting zone 14, a sorter 42 associated with the conveyor 11 receives a signal from a sort sensor 40 based on the predetermined characteristic and selectively deflects the designated item into an associated chute 20. A control system 70 controls the operation of the sortation system. The control system 70 for the sortation system 10 sends a signal to the sorter 42 to deflect a selected item to a designated receptacle via an associated chute 20.

The chutes 20 extend in series along the length of the conveyor for form a sorter output area 16 on one or both sides of the conveyor 11. The chutes 20 decline downward from an upper end 26 to a lower end 27 across the width of the chute. Each chute 20 includes fixed side walls 28 defining the length of the chute in the longitudinal sorting direction 12, which corresponds to the associated sorting portion. Receptacles, shown as bins 30, collect the sorted items. Each receptacle is associated with a dedicated chute 20 and the sorting system 10 has a fixed number of outputs. The fixed side walls 28 of the chutes prevent diverted objects from landing in the wrong receptacle 30.

The conveyor 11 can be, for example, an activated-roller conveyor belt, such as the INTRALOX® Series 7000 belt manufactured and sold by Intralox, L.L.C., of Harahan, La., U.S.A. The conveyor belt includes belt rollers that selectively actuated in a sorting zone 14 by an actuating mechanism in the belt carryway to rotate in a divert direction to push parcels off the side of the belt and onto a chute 20. Together, the belt rollers and the actuating mechanism form a diverter in each sorting zone 14. The actuating mechanism, which includes actuating rollers under each column of belt rollers in each sorting zone 14, provides actuating-roller surfaces that are free to rotate in a direction oblique to the conveying direction 12. The belt rollers, whose axes of rotation are parallel to the conveying direction, roll on the actuating rollers. In the oblique orientation, the actuating rollers cause the belt rollers to rotate in the divert direction toward the chutes 20. The resultant of the vector sum of the component of belt motion in the conveying direction 12 and the component of belt-roller rotation is an oblique divert angle off the side of the belt.

Figure 2:
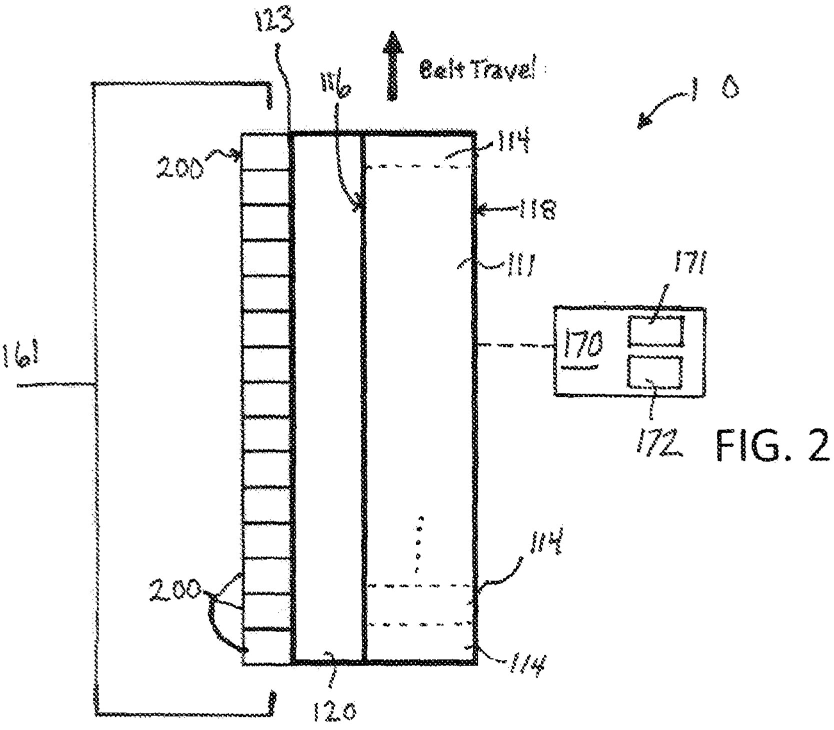
FIG. 2 is a schematic overhead view of a dynamic sorting system according to an embodiment.

FIG. 2 shows a dynamic sorting system 110 of an embodiment of the invention. The dynamic sorting system 110 includes a sorting conveyor 111 extending longitudinally from a first, input end to a second, output end for conveying items to be sorted. The sorting conveyor forms a series of sorting zones 114 along the length of the sorting conveyor for selectively diverting items off either side of the sorting conveyor 111, as described above. A first continuous chute 120 extends along the first side 116 of the sorting conveyor and, optionally, a second continuous chute (not shown) may extend along the second side 118 of the sorting conveyor 111. Alternatively, the sorting system may comprise a chute on only one side of the sorting conveyor. The chute 120 forms a continuous downward-sloping surface extending from each conveyor side 116, 118 without dividing walls. The chute 120 spans multiple sorting zones 114. The illustrative chute 120 spans the length of the sorting conveyor 111 to form a sorter output area 161 extending from the infeed to outfeed of the sorting conveyor, but the invention is not so limited.

At the downward end 123 of the chute 120, movable receptacles 200 receive items diverted from the sorting conveyor 111. The movable receptacles 200 can be arranged in a queue at the downward end of the chute 120. The movable receptacles 200, based on information from a controller 170, selectively move into a receiving position to catch a diverted item from the chute 120 on the fly. The movable receptacles 200 can comprise autonomous ground vehicles (AGVs) with a bin or other receiving container or another movable collection device.

Figure 3:
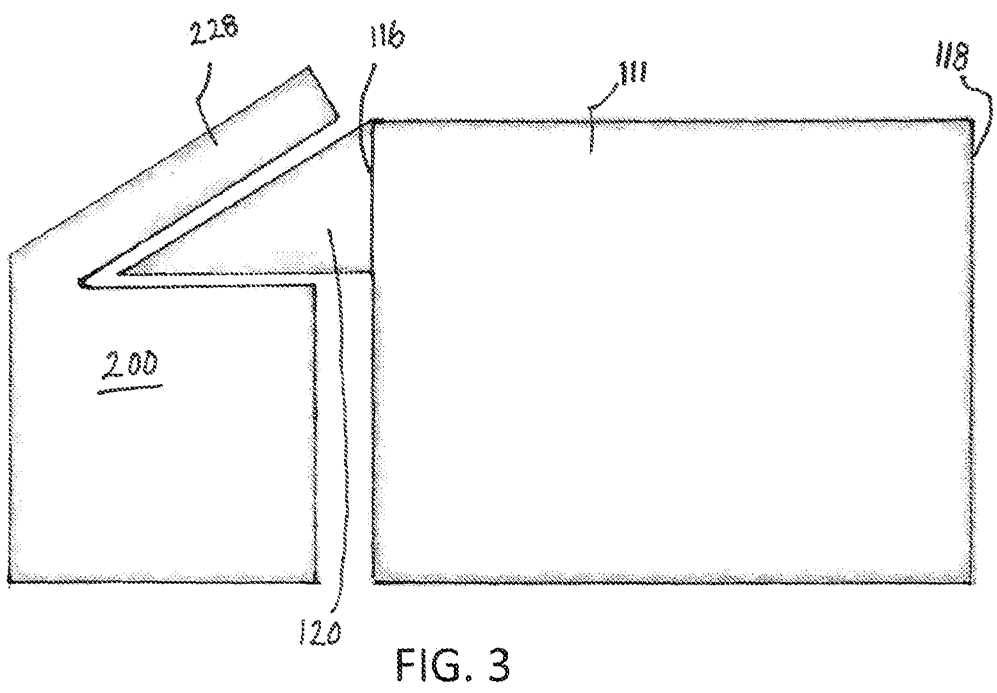
FIG. 3 is a front view of the dynamic sorting system of FIG. 2.
Figure 4:
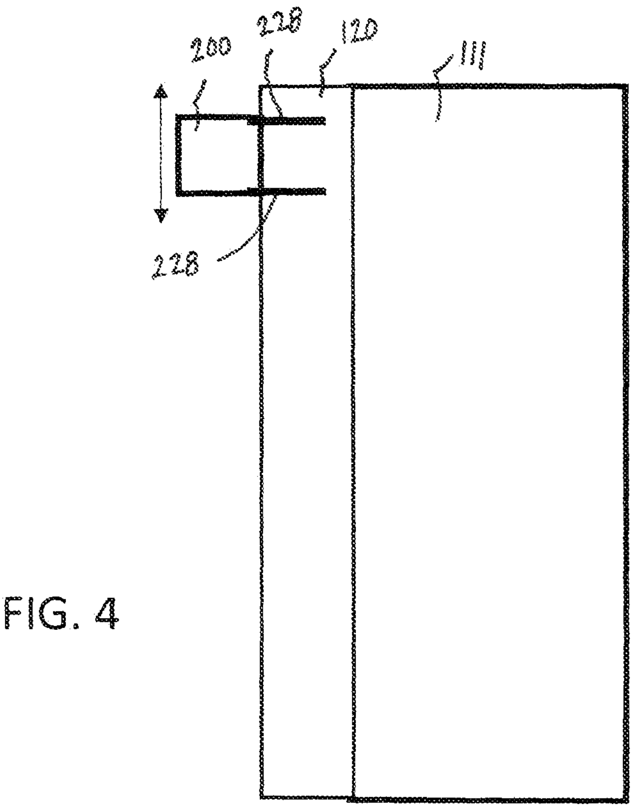
FIG. 4 is a schematic overhead view of a dynamic sorting system including a movable receptacle with integrated chute side walls.

As shown in FIGS. 3 and 4, the movable receptacles 200 may include side walls 228 configured to overlay a continuous chute 120 to define a movable sort destination. The side walls 228 move with the movable receptacle 200, so that the chute 120 does not itself define discrete sorting destinations. Rather, each movable receptacle 200 defines a particular sort destination, which may be determined on the fly.

The movable receptacle 200 can be in motion during the sorting process and is not required to be stationary while receiving a sorted item.

As shown in FIG. 2, the controller 170 for the dynamic sorting system 110 further includes a movable receptacle position tracker 171 for tracking the position of each movable receptacle 200. The movable receptacle position tracker 171 may track the position of a movable receptacle 200 in real-time or compute an expected trajectory of the movable receptacle 200. The controller 170 for the dynamic sorting system 110 further includes an item position tracker 172 for tracking the position of an item being sorted. Based on these two positions, the system can accurately coordinate the position of a particular receptacle 200 with the trajectory of an item diverted from the sorting conveyor 111 and designated for that particular receptacle 200.

For each item being sorted, the dynamic sorting system 110 identifies a suitable receptacle 200 alongside the sorting conveyor 111. Then, the dynamic sorting system 110 conveys the item to a designated sorting region 114. The designated receptacle 200 moves into position near the outlet of the designated sorting region 114. The item can be diverted from the sorting region onto the chute 120 and land on the receptacle 200 while the receptacle is moving. The controller 170 coordinates the trajectories of the item and the receptacle based on real-time tracking or a pre-computed expected trajectory.

Figure 5:
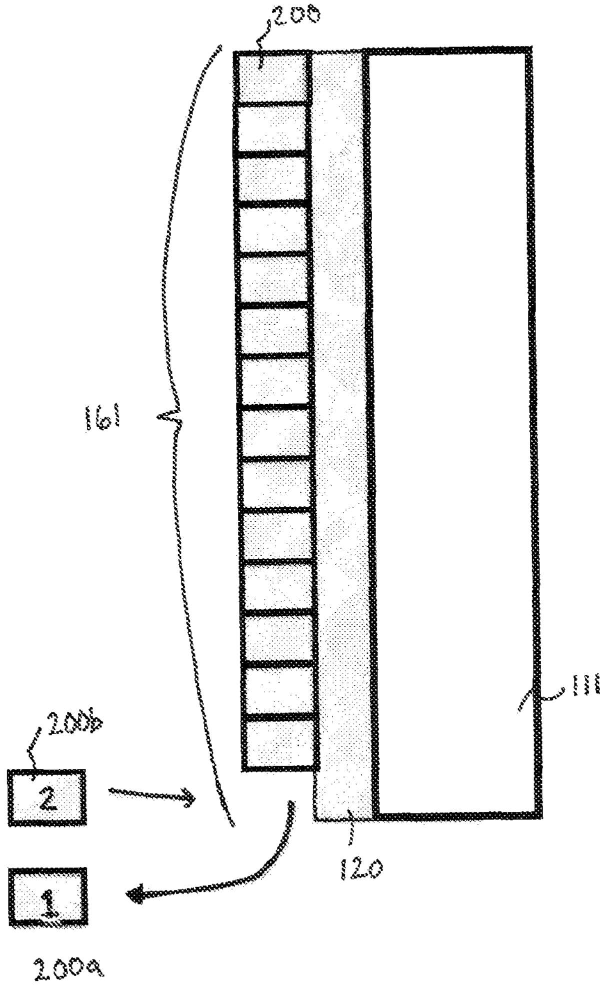
FIG. 5 shows a dynamic sorting system during replacement of a first movable receptacle with a second movable receptacle.

Referring to FIG. 5, in one embodiment, each receptacle 200 in a queue of receptacles forming an output region 161 of a sorter adjacent the downward end of a chute 120 can be replaceable. For example, a first receptacle 200*a* can be removed from the queue when it is full, or it is otherwise desirable to remove the receptacle from the output region 161. A second receptacle 200*b* can be inserted into the queue to replace the first receptacle 200*b*. Each receptacle 200 can include integrated side walls, as described above, that overlay the chute 120 and move with the receptacle to guide sorted items into the associated receptacle. The chute 120 and—or integrated side walls on the receptacles can be omitted if the receptacles 200 are appropriately configured and located.

Figures 6A, 6B:
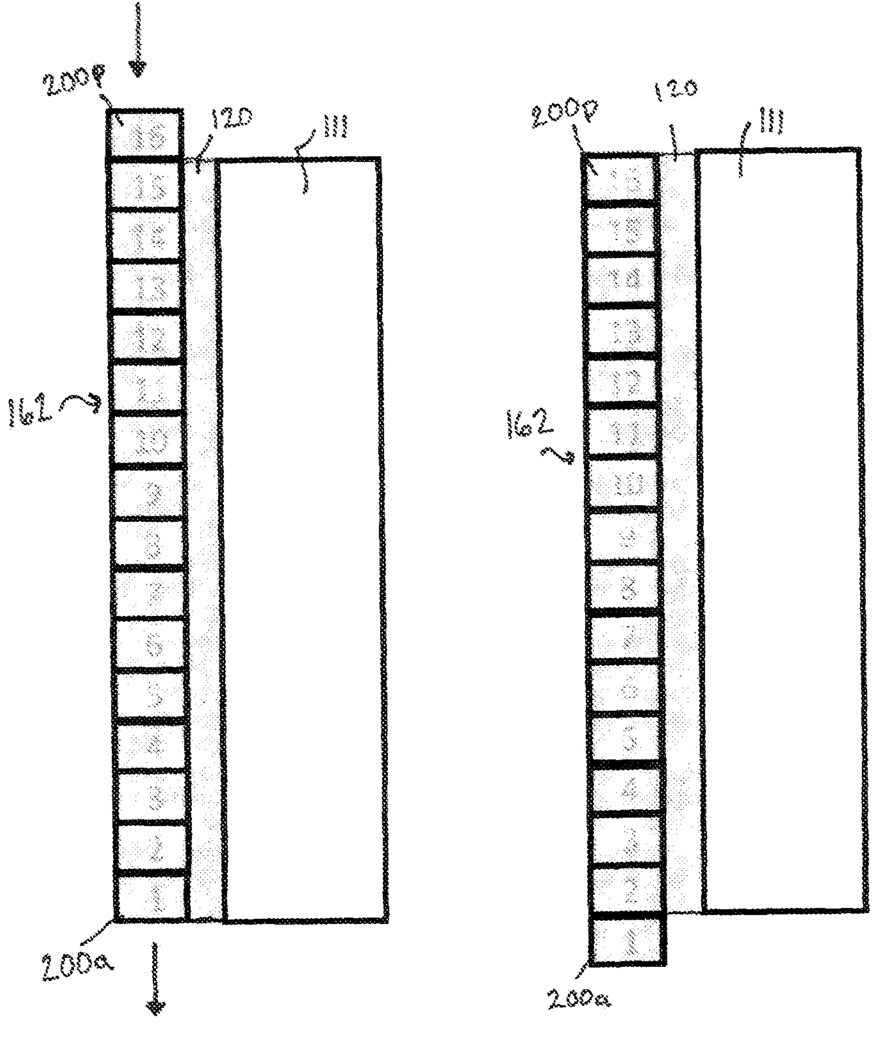
FIGS. 6A and 6B are schematic overhead views of a dynamic sorting system having a movable queue of receptacles for receiving sorted items.

In another embodiment, a queue of receptacles may shift longitudinally to adjust the capacity of a dynamic sorting system. For example, as shown in FIGS. 6A and 6B, a queue 162 of receptacles in an output region of a sorter 111 can shift longitudinally together to change the location of the receptacles and change the association of one or more receptacles with a sorting region, which can include a continuous chute 120 and—or integrated side walls on the receptacles 200. In an exemplary embodiment, when a first receptacles 200*a* is full, the queue 162 can shift the entire queue 162 to push the first receptacles 200*a* out of the sorter output area while inserting a new receptacle 200*p* from an "overflow region" at the downstream end of the sorter 111. The controller can then recalculate and coordinate the sorting of items based on the new locations of the receptacles. Items can be sorted onto their respective receptacles 200 while they are moving together, as described above. The queue may shift back to bring the first receptacle 200*a* into the sorter output area and push the overflow receptacle 200*p* out of the sorter output area, as needed.

Figures 7, 8:
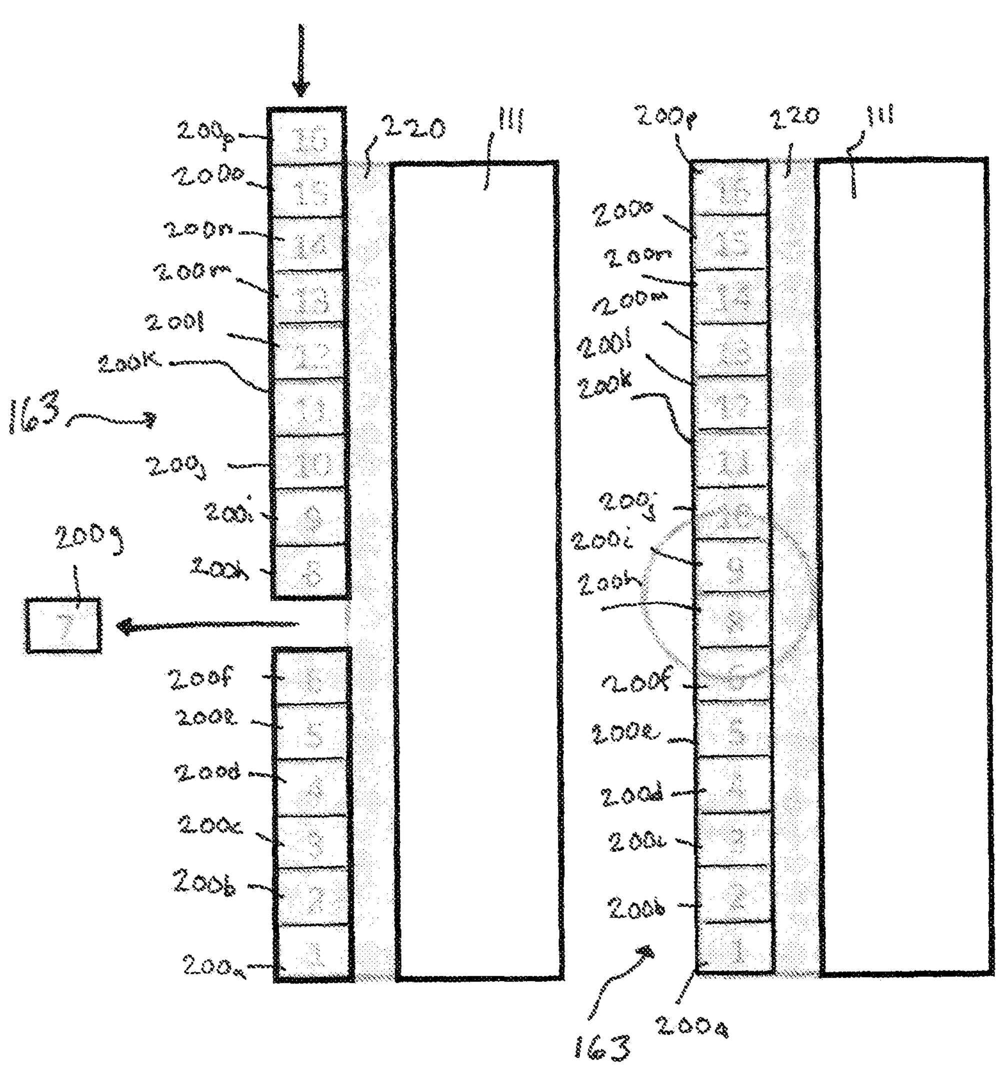
FIG. 7 is a schematic overhead view of a dynamic sorting system having a collapsible queue of receptacles for receiving sorted items.
FIG. 8 is a schematic overhead view of the dynamic sorting system of FIG. 7 after removal of a receptacle and collapsing of the queue.
Figures 9, 10:
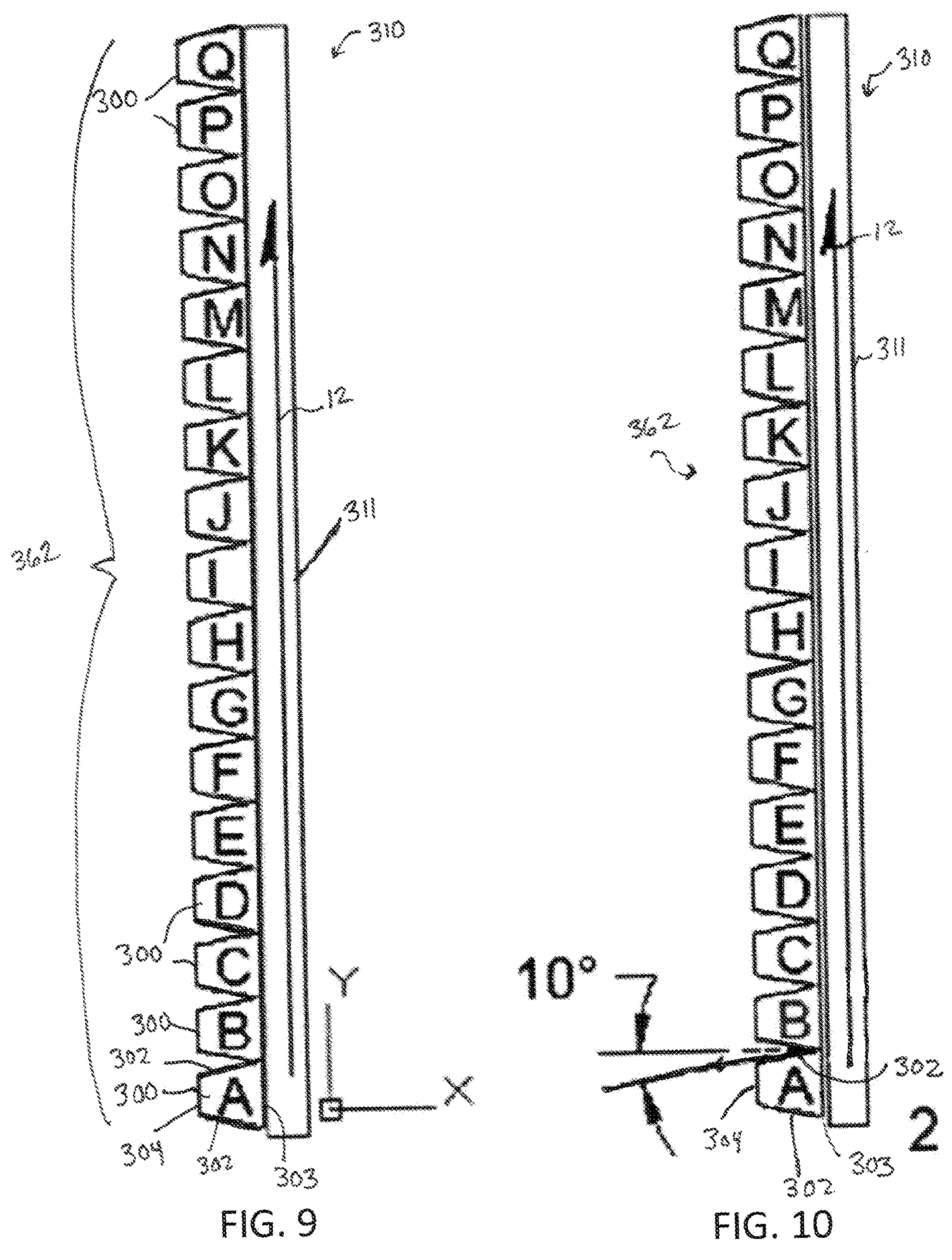
FIGS. 9-13 are a schematic overhead view of a dynamic sorting system including a queue of trapezoidal-shaped receptacles to facilitate collapsing of the queue when a receptacle is removed according to an embodiment.

Referring to FIGS. 7 and 8, in another embodiment of a dynamic sorting system, when a receptacle 200*g* is removed from a queue 163 of receptacles forming an output region of the sorter 111 (which can include a continuous chute 220 and—or integrated side walls on the receptacles), because it is full or for another reason, the other receptacles 200 in the queue 163 can collapse together to fill the void. In the illustrative embodiment, receptacles 200*h-p* shift upstream to fill the void, while keeping receptacles 200*a-f* in the same location. One or more receptacles 200*p* can come from an overflow region into the sorter output area during the shifting of the receptacles. The controller 170 takes the new positions, shown in FIG. 18, into account when determining when and where to sort a particular item so that it lands in the correct receptacle 200. In one embodiment, the dynamic sorting system can be "overbooked", i.e., have more receptacles 200 than sorting outputs, and shift, remove and add receptacles as needed. For example, a non-full receptacle can be removed from the queue if no designated items are en route to make room in the queue for another receptacle with a higher priority.

Figures 11, 12, 13:
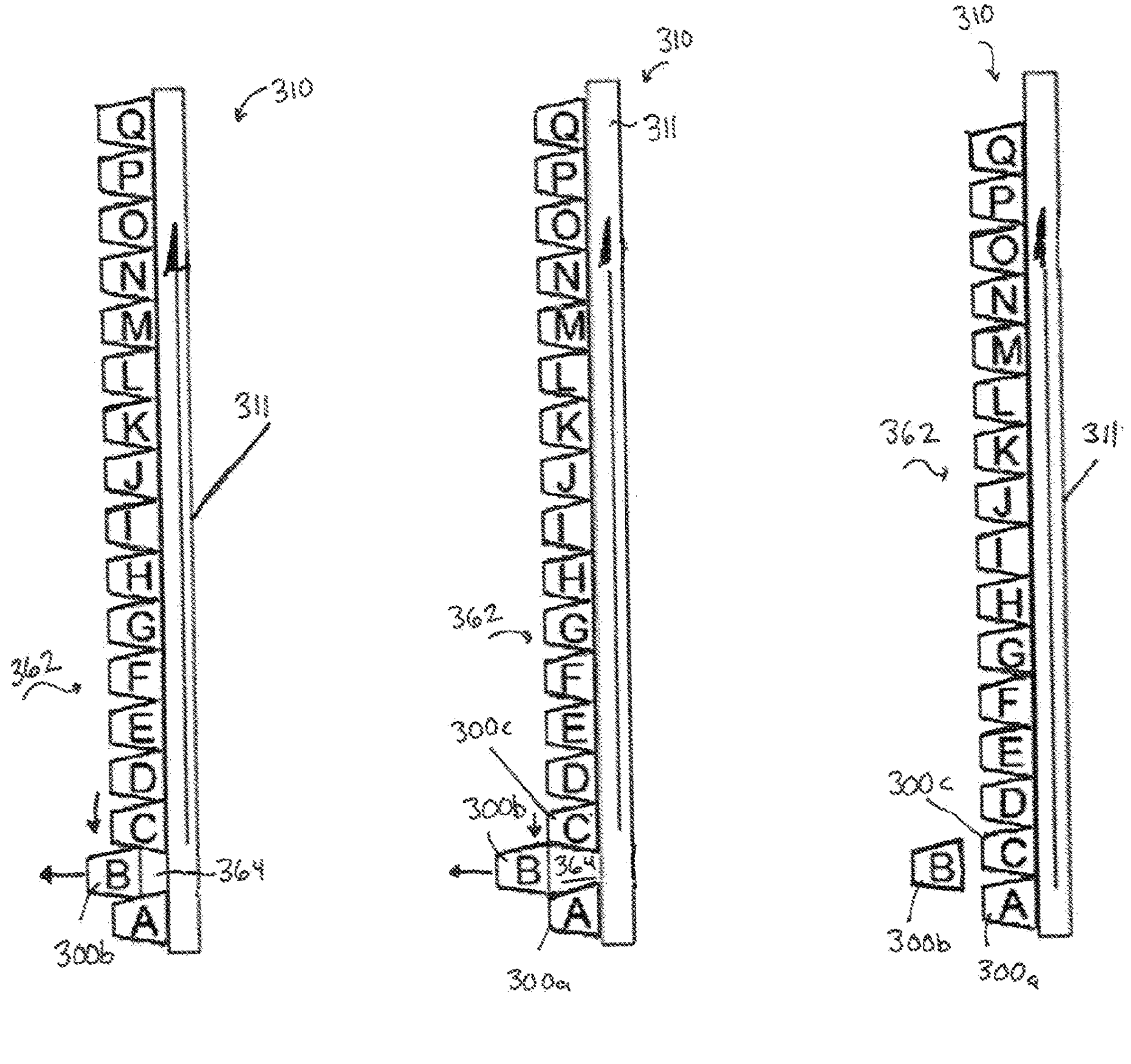

Referring to FIGS. 9-13, in another embodiment, the movable receptacles 300 in a dynamic sorting system 310 can have a trapezoidal shape to facilitate sorting to the receptacles. The trapezoidal shape (when viewed from above) optimizes the volume of the receptacles 300 and the speed at which the receptacle 300 can be removed from a queue in a sorter output area adjacent a sorting conveyor 311 and replaced with another receptacle. The illustrative end walls 302 of the receptacles 300 are angled about 10° relative to the lateral direction X, so that the length (in the longitudinal direction Y of conveyor travel) tapers away from the sorter 311. A first longitudinal wall 303 adjacent the sorter 311 is longer than a second longitudinal wall 304 distal from the sorting conveyor 311 to form the trapezoidal shape. As a receptacle 300*b* is removed from the queue 362, as shown in FIG. 11, the remaining receptacles 300 move together to fill the void 364, as shown in FIGS. 12 and 13, so that receptacles 300*a* and 300*c* are adjacent to each other. Either or both the upstream and downstream receptacles can shift to fill the void, but the Figures show only the downstream receptacles shifting upstream to fill the void 364. The controller for the dynamic sorting system 310 adjusts the sorting regions to reflect the changing positions of the receptacles. In the illustrative embodiment, the use of receptacles 300 with angled walls allows the downstream receptacles 300*c*-300*q* to move faster to fill the void 364. As shown in FIGS. 11 and 12, the queue 362 of receptacles 300 can start collapsing to replace the exiting receptacle 300*b* before the exiting receptacle 300*b* is fully extracted from the queue 362. The dynamic sorting system 310 can include a continuous chute in the sorter output area extending adjacent a side of the sorting conveyor 311 to facilitate deflection of a sorted item to a receptacle.

Figures 14A, 14B, 14C, 14D:
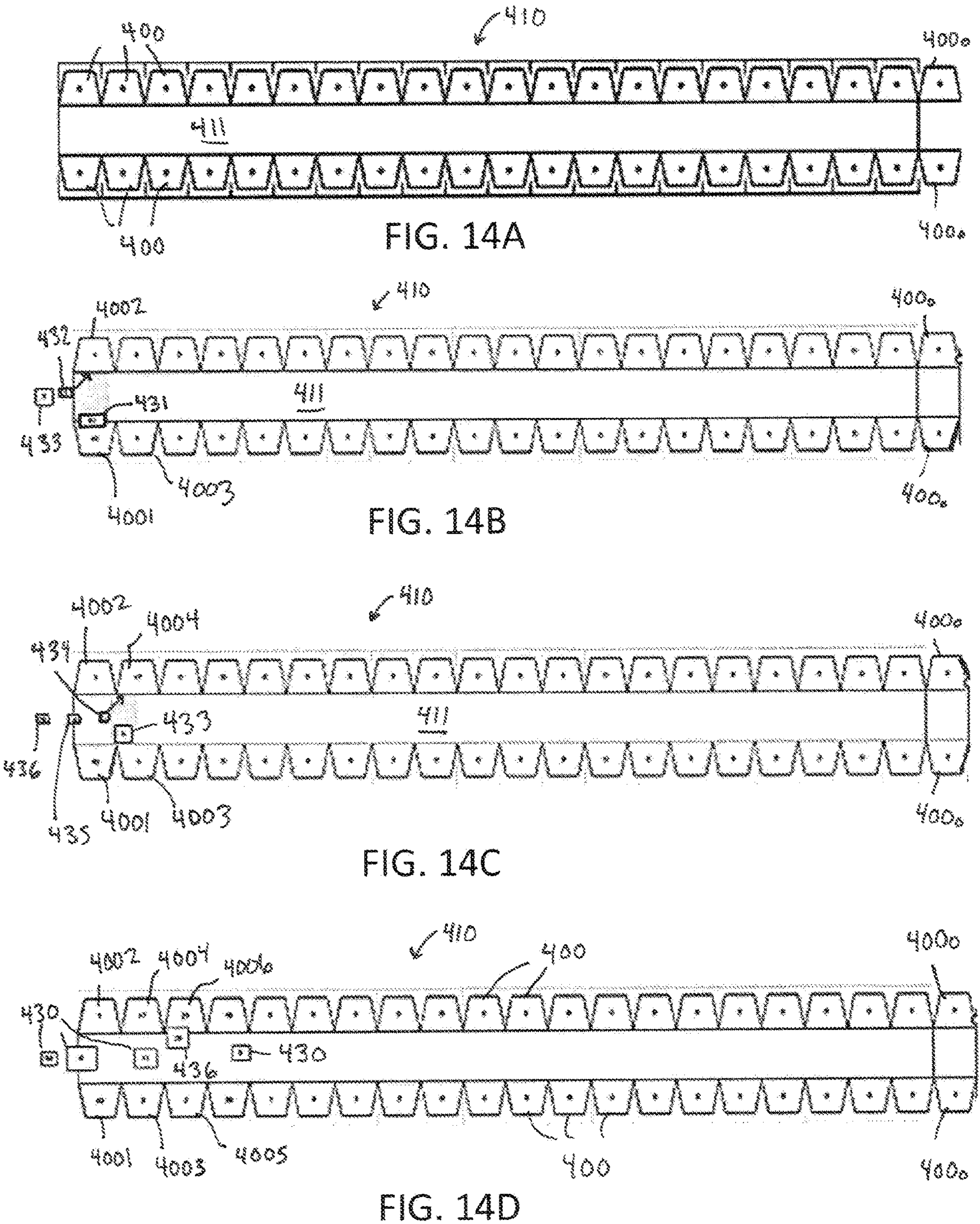
FIGS. 14A-14O are simulated, sequential overhead views of a dynamic sorting system during sorting of packages to movable receptacles according to an embodiment.
Figures 14E, 14F, 14G, 14H:
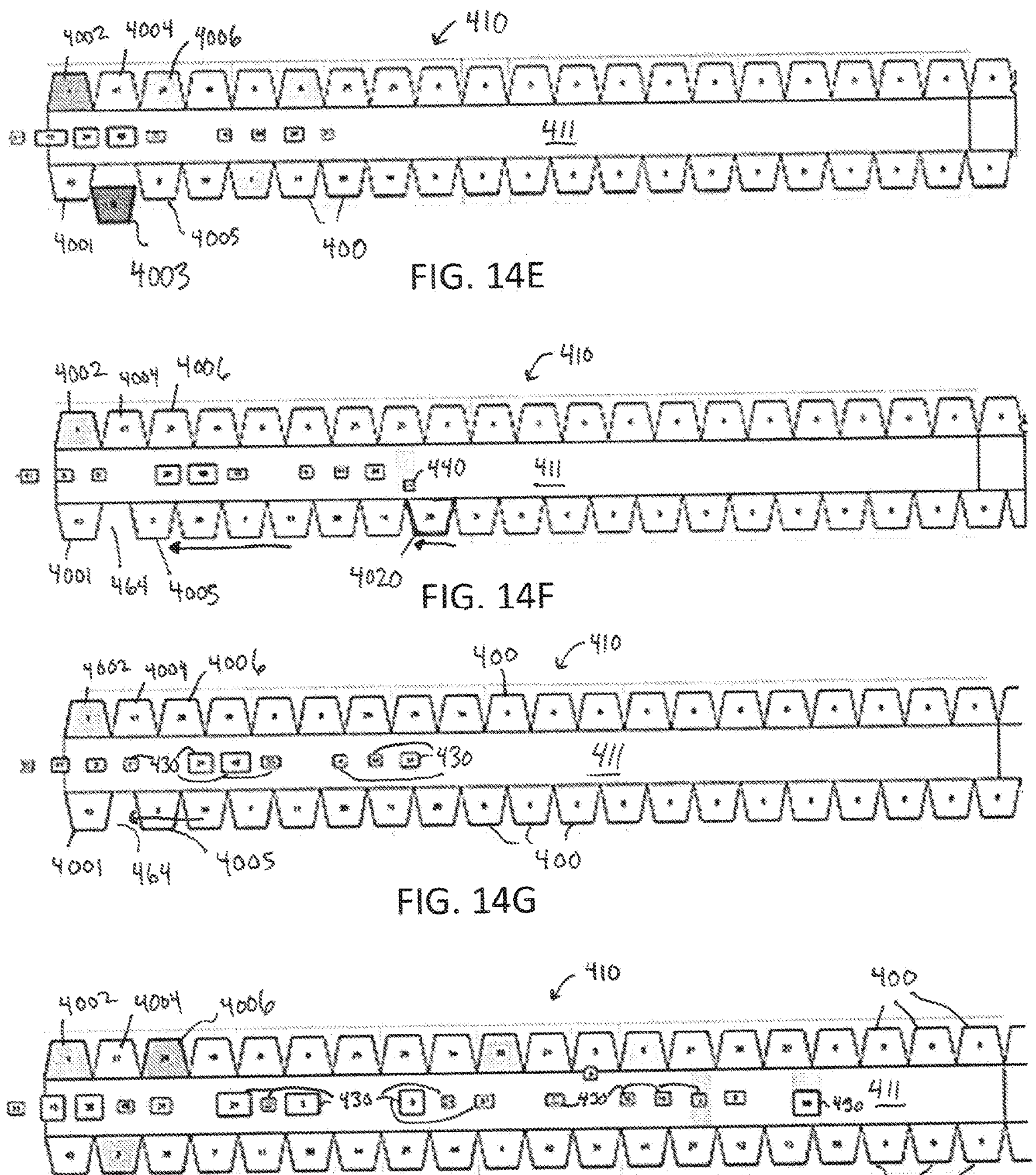
Figures 14I, 14J, 14K, 14L:
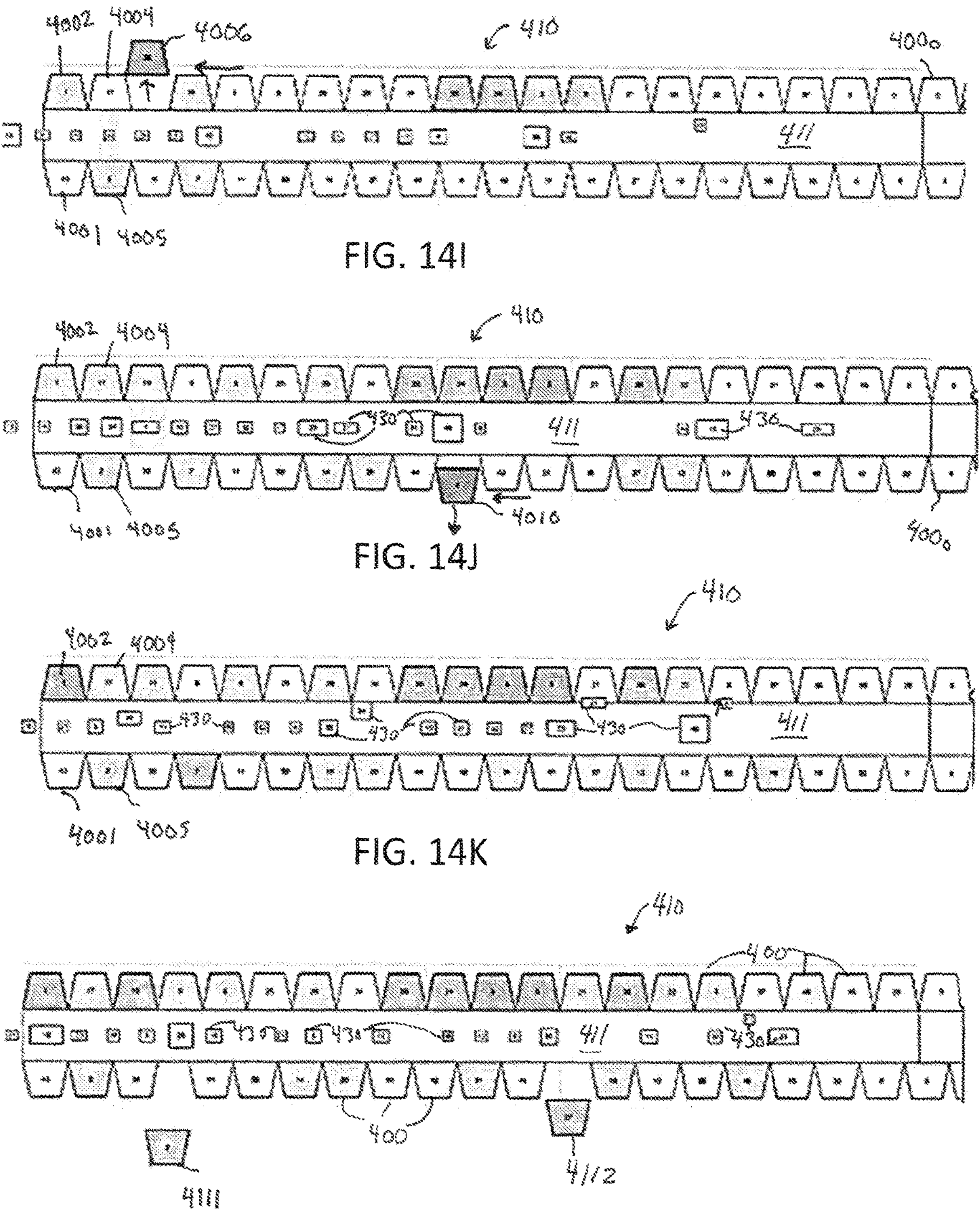
Figure 14M:
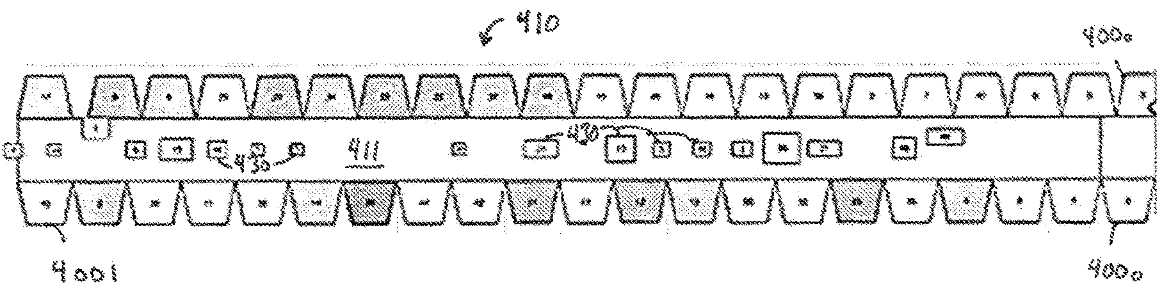
Figure 14N:
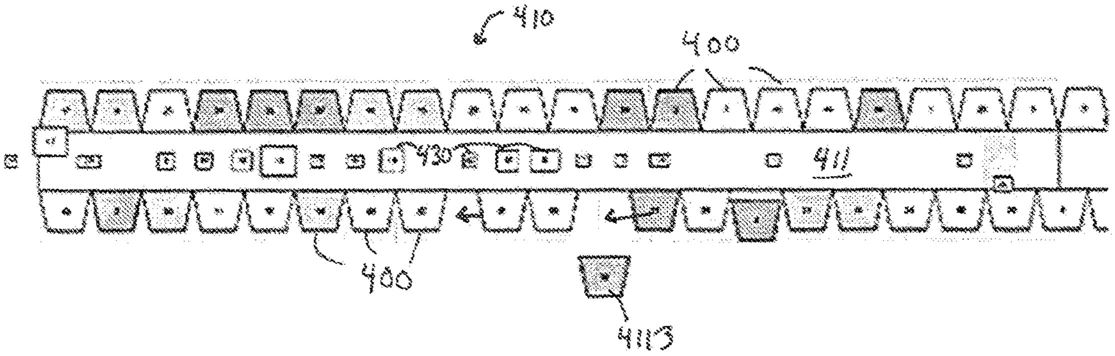
Figure 14O:
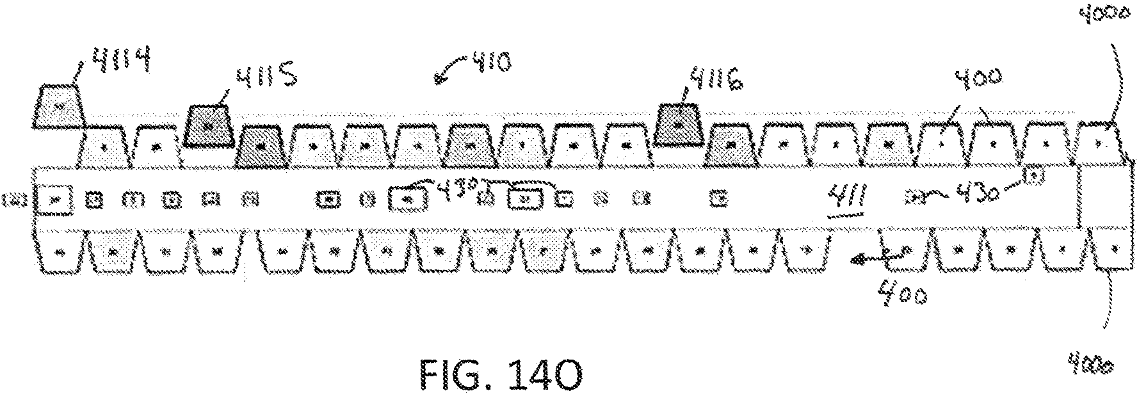

FIGS. 14A-14O are sequential overhead schematic views of a dynamic sorting system during sorting of incoming packages according to an embodiment. As shown in FIG. 14A, the initial configuration of the dynamic sorting system 410 includes a sorting conveyor 411 extending longitudinally in a direction of package travel from a first, input end to a second, output end, and laterally from a first side to a second side. A series of unassigned receptacles 400 are placed on each side of the sorting conveyor in a sorter output area, though alternatively, the receptacles 400 may be located on only one side of the sorting conveyor 411. The dynamic sorting system 410 can include a continuous chute in the sorter output area extending adjacent one or both sides of the sorting conveyor 411 to facilitate deflection of a sorted item to a receptacle 400. The receptacles 400 may include integrated side walls, as described above, that overlay the continuous chute, if used, to direct deflected packages from an associated sorting region into the corresponding receptacle.

The dynamic sorting system 410 is overbooked, i.e., there are more receptacles than sorting outputs to optimize the sorting process. The additional receptacles 400*o* at the end of the queue (outside the sorter output area) can be shifted into the active sorter output area as needed. The receptacles 400 can have a trapezoidal shape, as described above, to facilitate reconfiguration of the queue.

As sorting begins, as shown in FIG. 14B, packages entering the sorting conveyor 411 are assigned a receptacle 400. The dynamic sorting system controller can assign the receptacles during the sorting process, rather than before. For example, a first package 431 is assigned a first receptacle 4001 and deflected thereto. Subsequent packages with the same destination or other sorting parameter will be assigned and sent to the first receptacle 4001 as well. A second package 432 is assigned a second receptacle 4002 and deflected by a sorter in the associated sorting region thereto. After deflection of the first two packages 431, 432, a subsequent package 433 with a different destination or other sorting parameter is assigned a third receptacle 4003, and a fourth package 434 is assigned a fourth receptacle 4004, as shown in FIG. 14C. In one embodiment, the first packages are assigned the first, most upstream receptacles 400, but the invention is not so limited, and the controller can associate any receptacle with a particular sorting parameter.

As more packages 435, 436 enter the sorting conveyor 411, a controller can dynamically assign each package to either a previously designated receptacle, or a newly-assigned receptacle 4005, 4006, as shown in FIG. 14D. Packages 430 continue down the sorting conveyor 411 until they reach a sorting region next to assigned receptacle 400, where the sorting region deflects the package into the assigned receptacle.

As time elapses and the receptacles 400 fill up, it may be desirable to remove a receptacle from the queue. For example, as shown in FIG. 14E, the third receptacle 4003 may be removed from the queue of receptacles 400 and the downstream receptacles shifted to fill the void 464 from the exiting receptacle 4003, as shown in FIGS. 14E, 14F and 14G. The controller can continue to dynamically assign packages 430 to either a previously designated receptacle, or a newly-assigned receptacle 400, even while the receptacles 400 move to fill the void in the queue. For example, a shifting receptacle 4020 can receive a designated package 440 while shifting, with the controller calculating the precise trajectory to land the package 440 in the designated receptacle 4020 while it is moving, as shown in FIG. 14F. Incoming packages continue to be assigned and deflected to assigned receptacles 400, as shown in FIG. 14G.

As shown in FIG. 14H, the dynamic sorting system 410 continues to receive and sort packages, with the subsequently assigned packages filling the length of the sorting conveyor 411 until each package 430 reaches and is deflected to an assigned receptacle 400. Less frequent destination packages and associated receptacles can be concentrated at the beginning of the sorting conveyor 411, giving more time for sorting more frequent destination packages downstream.

In an exemplary embodiment, as another receptacle 4006 fills or is not immediately needed, the controller may remove the receptacle 4006 from the queue, as shown in FIG. 14I, shifting the remaining receptacles 400 to fill the vacancy and bringing unassigned receptacles 400*o* into the sorter output area, while continuing to dynamically assign and sort packages 430 to receptacles 400, as shown in FIG. 14J. In FIG. 14J, another receptacle 4010 leaves the queue during sorting, with remaining receptacles shifting to fill the vacancy and bringing overflow receptacles 400o from an overflow region into the sorter output area. As shown in FIGS. 14K-14O, the dynamic sorting system 410 continues to send package 300 down the sorting conveyor 411, dynamically assigning and sorting each package to either a previously-assigned receptacle or assigning a new receptacle and sorting the package to the newly-assigned receptacle. The sorting conveyor 411 fills as more packages 430 continue down the sorting conveyor until a suitable receptacle 400 is available, assigned and sorted to. As necessary, receptacles, shown as receptacles 411, 4112, 4113, 4114, 4115, 4116, can be removed and replaced dynamically during the sorting process, and additional receptacles 4000o from the overflow region brought into the active sorter output region, then assigned as necessary.

Non-full receptacles can be removed whenever space is needed along the sorting conveyor 411. Preferably, a receptacle is removed when no targeting package is already on the sorting conveyor 411. However, in the event that a receptacle 400 associated with a package on the sorting conveyor 411 has been removed, the controller can assign a receptacle 400 at a downstream end of the sorting conveyor 411 to receive the package.

In one embodiment, the controller checks the number of packages approaching the output end of the sorting conveyor 411 for which no receptacle 400 is available or yet assigned. If necessary, the controller removes the fullest receptacle 400 not having a targeting package already on the sorting conveyor 411, shifts the receptacles, bringing a new, unassigned receptacles into the queue and assigning the unassigned package to the new receptacle.

Receptacles for least-frequent destination packages can be concentrated at the beginning of the sorting conveyor 411 to allow more time for sorting the more frequent destination packages.

The illustrative dynamic sorting system allows the sorting conveyor to serve more receptacles (and therefore more destinations or other sorting outputs) with a smaller footprint.

The scope of the claims is not meant to be limited to the details of the described exemplary embodiments.

What is claimed is:

1. A sorting system, comprising:

a plurality of sorting regions arranged in series and extending longitudinally from a first end to a second end and forming a sorter output area;

a chute extending at a downward angle from the plurality of sorting regions, the chute having a continuous surface extending from the first end to the second end, a top edge adjacent a first side of the plurality of sorting regions and a bottom edge below the top edge;

a plurality of movable receptacles in the sorter output area below the bottom edge of the chute for receiving items from the sorting regions; and a controller for coordinating a position of an assigned movable receptacle with an item sorted from a sorting region, so that the item lands on the assigned movable receptacle while the assigned movable receptacle is moving.

2. The sorting system of claim 1, wherein each movable receptacle has a pair of side walls configured to extend over the continuous surface of the chute to define a sorting path into the movable receptacle.

3. The sorting system of claim 1, wherein each movable receptacle has a trapezoidal shape, having a length that tapers away from the plurality of sorting regions.

4. The sorting system of claim 3, wherein each movable receptacle has opposing end walls that are angled about 10° relative to a lateral direction.

5. The sorting system of claim 1, further comprising an overflow region comprising at least one overflow movable receptacle for moving into the sorter output area when a movable receptacle is removed from the sorter output area.

6. A sorting system, comprising:

a plurality of sorting regions arranged in series and extending longitudinally from a first end to a second end to form a sorter output area;

a queue of movable receptacles adjacent a first side of the plurality of sorting regions for receiving items from the sorting regions, wherein each movable receptacle has a trapezoidal shape, having a length that tapers away from the plurality of sorting regions; and a controller for coordinating a position of an assigned movable receptacle with an item sorted from a sorting region, so that the item lands on the assigned movable receptacle while the assigned movable receptacle is moving.

7. The sorting system of claim 6, wherein each movable receptacle has opposing end walls that are angled about 10° relative to a lateral direction, a first longitudinal wall adjacent a sorting region that is longer than a second longitudinal wall distal from the sorting region.

8. The sorting system of claim 6, further comprising an overflow region comprising at least one overflow movable receptacle for moving into the sorter output area when a first movable receptacle is removed from the queue.

9. The sorting system of claim 8, wherein the overflow region is downstream of the second end of the plurality of sorting regions.

10. A method of sorting an item into a selected movable receptacle, comprising the steps of:

identifying a movable receptacle for an item;

conveying the item to a sorting region in a sorting conveyor;

moving the movable receptacle to a selected position in a sorter output area adjacent to the sorting region;

deflecting the item from the sorting region so that the item lands on the movable receptacle while the movable receptacle is moving.

11. The method of claim 10, wherein each movable receptacle has a trapezoidal shape, having a length that tapers away from the sorting region.

12. The method of claim 11, wherein each movable receptacle has opposing end walls that are angled about 10° relative to a lateral direction.

13. The method of claim 10, wherein the movable receptacle is moved adjacent a bottom edge of a chute in the sorter output area.

14. The method of claim 10, further comprising the step of removing a non-receiving movable receptacle from the sorter output area and moving the identified movable receptacle to the selected position.

15. The method of claim 14, wherein the identified movable receptacle is moved from an overflow region to the sorter output area while the package is on the sorting conveyor.

16. The method of claim 14, wherein the step of moving the identified movable receptacle comprises shifting a queue of movable receptacles while the non-receiving receptacle is removed from the sorter output region.

* * * * *